Patented Apr. 12, 1949

2,467,054

UNITED STATES PATENT OFFICE 2,467,054

INCREASING PARTICLE SIZE OF SYNTHETIC RUBBER LATICES

John S. Rumbold, Woodbridge, Conn., assignor to United States Rubber Company, New York, N. Y., a corporation of New Jersey No Drawing. Application February 19, 1947, Serial No. 729,675

2 Claims. (Cl. 260—23.7)

This invention relates to the treatment of synthetic rubber latices, and more particularly to increasing the particle size of synthetic rubber latices prepared with water-soluble soaps of abietic acid as dispersing agents.

The preparation of synthetic rubber latices by the emulsion polymerization in aqueous medium containing emulsifying agent, of butadienes-1,3 or mixtures of butadienes-1,3 with other polymerizable compounds capable of forming copolymers with butadienes-1,3, is known. Such synthetic rubber latices have an average particle diameter of 0.07 to 0.12 (about 0.1) micron, which is much less than in the case of natural latex. In order to improve colloidal properties, such as surface tension, stability, and the like, it has been found desirable to increase the particle size of such synthetic rubber latices as by the addition of non-colloidal alkali salts to the latex, with or without further stabilizers in addition to the emulsifying agent in the latex. Where the synthetic rubber latex contains water-soluble soaps of abietic acid as the emulsifying agent from the emulsion polymerization, it is very difficult to appreciably increase the particle size of the latex by addition of alkali salts without the formation of excessive amount of coagulum which must be filtered off with consequent loss of synthetic rubber from the latex. When additional dispersing agents, such as salt-stable surface active agents, e. g., alkali metal alkaryl sulfonates or alkali metal alkyl sulfates are added to further protect the dispersed synthetic rubber particles on addition of the salt, these additional dispersing agents also inherently tend to prevent the desired particle enlargement by the salt, and it is very difficult to raise the average particle diameter of a synthetic rubber latex containing a water-soluble soap of abietic acid as the emulsifying agent to an average particle diameter of over 0.15 micron with the addition of a non-colloidal alkali salt and sufficient additional salt-stable surface-active agent to prevent formation of excessive amounts of coagulum flocs on addition of the salt.

I have found that in the case of synthetic rubber latices prepared with water-soluble soaps of abietic acid as the only soap emulsifying agents, the addition of small amounts of water-soluble soaps of fatty acids having 9 to 17 carbon atoms in the aliphatic group act to further increase the particle size of the latex when the particles are enlarged by the addition of a water-soluble non-colloidal alkali salt and a surface-active agent other than a soap which also contains an aliphatic group having 9 to 17 carbon atoms. The fatty acid soap will only act in the anomalous manner when added in small amounts, namely from 0.2 to 1.1% by weight of the solids of the latex. When added in larger amounts, such fatty acid soaps act only in their usual manner as stabilizing and dispersing agents and tend to counteract the enlarging effect of the added salt. Once the particle size of the latex has been increased according to the present invention, further fatty acid soaps may be added to stabilize the enlarged particle-size latex without reduction of the particle size. The amount of such other surface-active agent containing an aliphatic group having 9 to 17 carbon atoms should also be from 0.2 to 1.1% by weight of the solids of the latex to obtain maximum particle size enlargement by the non-colloidal alkali salt addition. The amount of non-colloidal alkali salt addition is not critical, amounts from 0.5 to 10% by weight of the solids of the latex being satisfactory.

The water-soluble soap of abietic acid used as the emulsifying agent in the preparation of the synthetic rubber latex may be an alkali metal, ammonium or substituted ammonium (amine) salt of any form of abietic acid, such as salts of crude wood rosin, purified rosin, hydrogenated abietic acid, or heat rearranged abietic acid such as disproportionated abietic acid which is formed by heating abietic acid and a catalyst in known manner whereby so-called disproportionation takes place and two fractions are formed, one having a higher degree of saturation and one a lower degree of saturation than the original abietic acid. The amount of such abietic soap emulsifying agent may be from 2.5 to 10 parts by weight per 100 parts of polymerizable material, which amount to 2.5 to 10 parts or more by weight per 100 parts of the latex solids depending on the conversion. The water-soluble soap of fatty acids having 9 to 17 carbon atoms in the aliphatic group may be the alkali-metal, ammonium or substituted ammonium salts of saturated or unsaturated aliphatic acids having 9 to 17 carbon atoms in the aliphatic group, such as capric acid, undecylinic acid, lauric acid, myristic acid, palmitic acid, stearic acid, oleic acid, and linoleic acid. The alkali-metal, ammonium, and substituted ammonium salts are generically referred to herein as "alkali salts" as in common practice, and the term "alkali salts" is used in its accepted sense as exclusive of the alkaline-earth salts. The non-colloidal alkali salts that are added to the synthetic rubber latex to effect the enlargement of particle size may be alkali-metal, ammonium or substituted ammonium salts of water soluble acids, such as carbonic acid, oxalic acid, formic acid, acetic acid, propionic acid, butyric acid, boric acid, hydrochloric acid, and sulfuric acid.

Surface-active agents, which are not soaps, and which contain an aliphatic group having 9 to 17 carbon atoms are well known, and many such materials are available commercially. They may be compounds of the formula R—SO₃—M, where M is an alkali-metal and R is an organic radical that contains an aliphatic group having 9 to 17 carbon atoms, such as alkali-metal alkyl sulfates (e. g. sodium dodecyl sulfate); alkali-metal alkyl sulfonates (e. g. dodecyl sodium sulfonate, cetyl potassium sulfonate); alkali-metal salts of sulfonated ethers of long and short chain aliphatic groups (e. g. C₁₇H₃₃—O—C₂H₄—SO₃Na), alkali-metal salts of sulfated ethers of long and short chain aliphatic groups (e. g.

C₁₇H₃₃—O—C₂H₄—O—SO₃Na)

alkali-metal salts of sulfonated alkyl esters of long chain fatty acids (e. g.

alkali-metal salts of sulfonated glycol esters of long chain fatty acids (e. g.

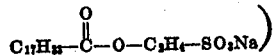

alkali-metal salts of sulfonated alkyl substituted amids of long chain fatty acids (e. g.

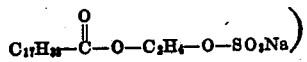
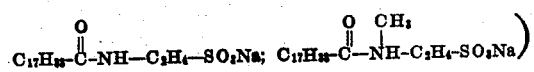

alkali-metal alkyl aryl sulfonates (e. g. dodecyl benzene sodium sulfonate). The surface-active agents, other than soaps, which contain an aliphatic group having 9 to 17 carbon atoms may be polyether alcohols, such as the reaction products of ethylene oxide or polyethylene glycol, with a long chain fatty alcohol (e. g. reaction product of ethylene oxide and oleyl alcohol), or the surface-active agents may be polyglycol esters, such as the reaction products of ethylene oxide or polyethylene glycol with a long chain fatty acid (e. g. reaction product of polyethylene glycol with oleic acid).

In the preparation of synthetic rubber latices, as is known, polymerizable monomeric compounds are emulsified in an aqueous medium by means of an emulsifying agent, and polymerization is made to take place generally at elevated temperatures in the presence of a catalyst and other regulating materials. In the present case the emulsifying agent for the synthetic rubber latex is a water-soluble soap of abietic acid, alone or with an additional surface-active agent which does not have any aliphatic group containing more than 8 carbon atoms. After the desired amount of polymerization has taken place, the unreacted monomers are removed from the synthetic rubber latex, as by venting off gaseous monomers and steam distilling liquid monomers. Examples of such polymerizable material are the various butadienes-1,3, for example, butadiene-1,3, methyl-2-butadiene-1,3 (isoprene), chloro-2-butadiene-1,3 (chloroprene), piperylene, 2,3-dimethyl-butadiene-1,3 and mixtures thereof. The polymerizable material as known may be a mixture of one or more such butadienes-1,3 with one or more other polymerizable compounds which are capable of forming rubbery copolymers with butadienes-1,3, for example, up to 70% of such mixture of one or more compounds which contain a CH₂=C< group where at least one of the disconnected valances is attached to an electroactive group, that is, a group which substantially increases the electrical dissymmetry or polar character of the molecule. Examples of compounds which contain a CH₂=C< group and are copolymerizable with butadienes-1,3 are aryl olefines, such as styrene, and vinyl naphthalene, the alpha methylene carboxylic acids, and their esters, nitriles and amides, such as acrylic methyl esters, nitriles and amides, such as acrylic methyl methacrylate, acrylonitrile, methacrylonitrile, methacrylamide; isobutylene; methyl vinyl ether; methyl vinyl ketone; vinylidene chloride. Such synthetic rubbers are conjugate diolefin polymer synthetic rubbers. Present day commercial synthetic rubbers of the above types are polymerized chloro-2-butadiene-1,3, known as neoprene or GR–M rubber, copolymers of butadiene-1,3 and styrene, known as Buna S or GR–S rubber, and copolymers of butadiene-1,3 and acrylonitrile, know as Buna N or GR–A rubber.

The following examples are illustrative of the present invention, all parts recited therein being by weight:

*Example I*

A GR–S synthetic rubber latex was prepared by polymerizing an aqueous emulsion containing 50 parts butadiene-1,3, 50 parts styrene, 140 parts water, 5 parts sodium abietate (emulsifying agent), 1 part sodium isopropyl naphthalene sulfonate (additional stabilizer), and 0.3 part potassium persulfate (catalyst) at about 122° F. for about 18 hours, giving an 88% conversion of monomers to copolymer. The average particle diameter of the latex was 0.1070 micron. Particle size determinations referred to herein were measured by the light scattering method with a Photo-Volt Lumetron colorimeter measuring the intensity of the light scattered at an average angle of 90° to the incident beam. To a portion of the latex was added 0.35% sodium dodecyl sulfate, and 5% ammonium bicarbonate (as a 5% aqueous solution) based on the latex solids, and to various samples thereof also was added none (control), 0.3, 0.4, 0.5 and 0.6% of a potassium soap of higher fatty acids including capric and lauric acids. After 48 hours, the samples were stabilized with 2% ammonium laurate based on the latex solids. The total solids content of the samples was about 30%. Measurements were made of the average particle diameters of the samples. The control sample to which no potassium soap of higher fatty acids was added had an average particle diameter of 0.1761 micron, and the other samples to which 0.3, 0.4, 0.5 and 0.6% potassium soap of higher fatty acids had been added had average particle diameters of 0.1809, 0.1918, 0.1870 and 0.1963 micron respectively.

*Example II*

To another portion of the GR–S latex of Example I was added 0.35% sodium lauryl sulfate and 5% ammonium acetate (as a 5% aqueous solution) based on the latex solids, and to various samples thereof also none (control) and various amounts of the potassium soap of higher fatty acids including capric and lauric acids. The average particle diameters were measured after 18 hours. The total solids of the samples was about 27%. The average particle diameter of the control to which no higher fatty acid soap was added was 0.1360 micron, whereas the average particle diameters of samples to which 0.5, 0.7, 0.9 and 1.1% of the potassium soap of higher fatty acids (based on the solids of the latex) had been added had average particle diameters of 0.1761, 0.1809, 0.1918, 0.1870 and 0.1963 microns, respectively.

In Examples I and II, either no coagulum or only insignificant amounts were formed in the enlarged particle size latex samples. If an attempt is made to omit the soap of higher fatty acids by using a higher concentration of the sodium dodecyl sulfate and a higher concentration of the non-colloidal salt (e. g. ammonium bicarbonate as in Example I), large amounts of macroscopic particles difficult to filter off are formed, and there is loss of synthetic rubber by coagulation. This is shown in the next example.

*Example III*

Another portion of the GR–S latex of Example I was used in this example. In this case there was added 0.5% sodium dodecyl sulfate and 5% of ammonium bicarbonate (as a 5% aqueous solution), with and without 0.2% of the potassium soap of higher fatty acids including capric and lauric acids, based on the latex solids. Measurements were taken after 20 hours. The latex concentrations were adjusted to 30% solids. The sample without the higher fatty acid soap had an average particle diameter of 0.1325 micron whereas the sample containing the higher fatty acid soap had an average particle diameter of 0.1998 micron. When an attempt was made to increase the particle size of the latex by addition of 6.7% ammonium bicarbonate with the 0.5% sodium dodecyl sulfate but without the higher fatty acid soap, there was formed 30% coagulum. Where the 0.5% sodium dodecyl sulfate and 6.7% ammonium bicarbonate (as a 5% aqueous solution) based on the latex solids was added together with 0.5, 0.75 and 1.0% of potassium soap of higher fatty acids including capric and lauric acids per 100 parts of latex solids, no significant amounts of coagulum were formed. Particle size measurements were taken on these sample after 20 hours. The concentrations were adjusted to 30%. The samples to which 0.5, 0.75 and 1.0% of the higher fatty acid soap had been added showed average particle diameters of 0.1903, 0.2024 and 0.1903 micron, respectively.

*Example IV*

In this case a 51% solids content neoprene latex which was an emulsion polymerizate of an aqueous emulsion of chloro-2-butadiene-1,3 containing about 5% sodium abietate based on the monomer content as emulfying agent was used. The average particle diameter of the latex was 0.1425 micron. To portions of the latex were added 2, 3 and 4% of ammonium bicarbonate based on the latex solids in sufficient water to reduce the latex solids to about 30%. The average particle diameter of the latex containing the 2% of ammonium bicarbonate (measured after 24 hours) was 0.1431 micron. The latex samples containing the 3% and 4% ammonium bicarbonate gelled within 24 hours and ½ hour, respectively. To other portions of the latex were added 0.5% sodium dodecyl sulfate and 2, 3 and 4% of ammonium bicarbonate based on the latex solids in sufficient water to reduce the latex solids to about 30%. The average particle diameter of the latex containing the 0.5% sodium dodecyl sulfate and 2% ammonium bicarbonate (measured after 24 hours) was 0.1410 micron. The latex samples containing the 0.5% sodium didecyl sulfate and the 3 and 4% ammonium bicarbonate gelled within 17 hours and ½ hour, respectively. This above data shows that the particle size of this latex cannot be increased with ammonium bicarbonate either alone or with the 0.5% of sodium dodecyl sulfate.

To other portions of the neoprene latex were added 0.5% sodium dodecyl sulfate, 4% ammonium bicarbonate based on the solids of the latex and varying amounts of potassium laurate. These materials were added in sufficient water to dilute the latex to about 30% solids and particle size measurements were taken after 24 hours. The latex samples to which 0.25%, 0.5, 1.0, and 1.25% lauric acid as potassium laurate were added in addition to the 0.5% sodium dodecyl sulfate and 4% ammonium bicarbonate (all based on the latex solids) had average particle diameters of 0.1717, 0.1677, 0.1479 and 0.1432 micron, respectively. No coagulum was formed in these samples.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of increasing the particle size of a conjugate diolefin polymer synthetic rubber latex comprising an aqueous emulsion polymerizate of polymerizable material selected from the group consisting of butadienes-1,3 and mixtures of butadienes-1,3 with monoolefinic compounds which contain a $CH_2=C<$ group and are copolymerizable with butadienes-1,3 which comprises adding to such a synthetic rubber latex having an average particle diameter of about 0.1 micron, 0.5 to 10% by weight based on the latex solids of a non-colloidal alkali salt of an acid of the group consisting of carbonic, oxalic, formic, acetic, propionic, butyric, boric, hydrochloric, and sulfuric acids in the presence of 2.5 to 10% by weight based on the latex solids of a water-soluble soap of abietic acid, and 0.2 to 1.1% by weight based on the latex solids of a water-soluble soap of a fatty acid having 9 to 17 carbon atoms in the aliphatic group and 0.2 to 1.1% by weight based on the latex solids of a surface-active agent which is selected from the group consisting of alkali-metal alkyl sulfates, alkali-metal alkyl sulfonates, alkali-metal salts of sulfonated ethers of long and short chain aliphatic groups, alkali-metal salts of sulfated ethers of long and short chain aliphatic groups, alkali-metal salts of sulfonated alkyl esters of long chain fatty acids, alkali-metal salts of sulfonated glycol esters of long chain fatty acids, alkali-metal salts of sulfonated alkyl substituted amids of long chain fatty acids, alkali-metal alkyl aryl sulfonates, polyether alcohols, and polyglycol esters, said surface active agent containing a long chain aliphatic group having 9 to 17 carbon atoms.

2. The method of increasing the particle size of a conjugate diolefin polymer synthetic rubber latex comprising an aqueous emulsion polymerizate of polymerizable material selected from the group consisting of butadienes-1,3 and mixtures of butadienes-1,3 with monoolefinic compounds which contain a $CH_2=C<$ group and are copolymerizable with butadienes-1,3 which comprises adding to such a synthetic rubber latex having an average particle diameter of about 0.1 micron, 0.5 to 10% by weight based on the latex solids of a non-colloidal alkali salt of an acid of the group consisting of carbonic, oxalic, formic, acetic, propionic, butyric, boric, hydrochloric, and sulfuric acids in the presence of 2.5 to 10% by weight based on the latex solids of a water-soluble soap of abietic acid, and 0.2 to 1.1% by weight based on the latex solids of a water-soluble soap of a fatty acid having 9 to 17 carbon atoms in the aliphatic group and 0.2 to 1.1% by weight based on the latex solids of sodium dodecyl sulfate.

JOHN S. RUMBOLD.

REFERENCES CITED

The following references are of record in the file of this patent:

UNITED STATES PATENTS

| Number | Name | Date |
| --- | --- | --- |
| 2,357,861 | Willson | Sept. 12, 1944 |